United States Patent [19]

Grawey et al.

[11] 4,393,913

[45] Jul. 19, 1983

[54] TIRE AND WHEEL CONFIGURATION

[75] Inventors: Charles E. Grawey, Peoria; John J. Groezinger, Dunlap, both of Ill.

[73] Assignee: Caterpillar Tractor Co., Peoria, Ill.

[21] Appl. No.: 287,541

[22] PCT Filed: Jun. 8, 1981

[86] PCT No.: PCT/US81/00758
§ 371 Date: Jun. 8, 1981
§ 102(e) Date: Jun. 8, 1981

[87] PCT Pub. No.: WO82/04224
PCT Pub. Date: Dec. 9, 1982

[51] Int. Cl.³ ............... B60C 9/00; B60C 5/00; B60B 21/00; B60B 25/00
[52] U.S. Cl. .................. 152/364; 152/361 R; 152/366; 152/379.3; 152/386; 152/395; 152/396; 152/DIG. 17; 301/95
[58] Field of Search ............ 152/362 R, 362 CS, 375, 152/379.3, 393, 395, DIG. 9, DIG. 17, 330 R, 352, 354 R, 363, 364, 366, 386, 379.5, 385, 396, 404, 405, 361 R, 354 RB; 301/95, 96

[56] References Cited

U.S. PATENT DOCUMENTS

| | | | |
|---|---|---|---|
| 607,043 | 7/1898 | James | 152/363 |
| 2,787,312 | 4/1957 | Servaes | 152/362 |
| 2,822,017 | 2/1958 | Herzegh | 152/362 |
| 3,117,614 | 1/1964 | Amici | 152/363 |
| 3,318,357 | 5/1967 | Schwall, Jr. | 152/363 |
| 3,448,783 | 6/1969 | Sons, Jr. | 152/362 |
| 3,504,725 | 4/1970 | Fletcher et al. | 152/362 |
| 3,998,258 | 12/1976 | Grawey et al. | 152/379.3 |
| 4,043,374 | 8/1977 | Smith | 152/405 |

Primary Examiner—Edward C. Kimlin
Assistant Examiner—Thomas Bokan
Attorney, Agent, or Firm—John W. Grant

[57] ABSTRACT

In many designs, a tire (14) of a wheel (10) is inadequately restrained with respect to a tire supporting rim assembly (12) of the wheel. Movement of the tire (14) with respect to the rim assembly (12) results in a wastage of energy. In the present invention a wheel assembly (10) has a rim assembly (12) and a tire (14) mounted on the rim assembly (12). The rim assembly (12) has an annular elastic element (22) affixed thereto for increasing the coefficient of friction between said rim assembly (12) and the tire (14).

16 Claims, 7 Drawing Figures

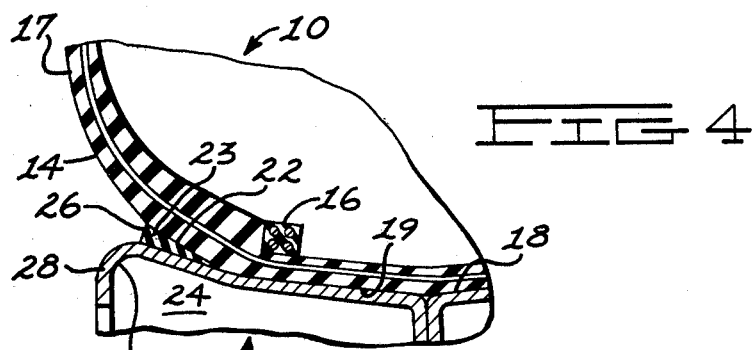
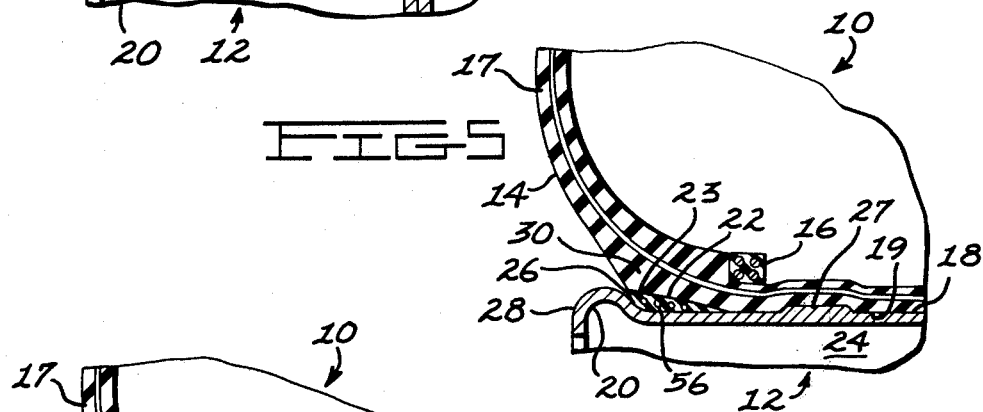
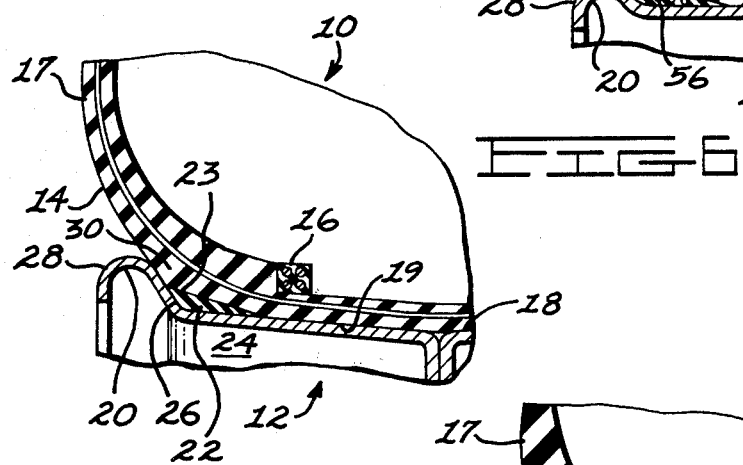
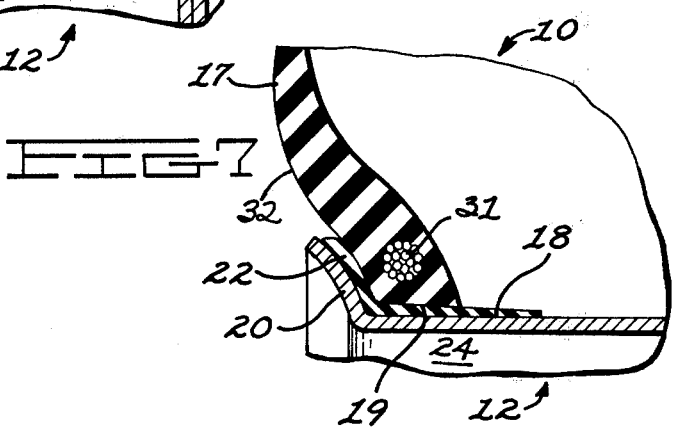

TIRE AND WHEEL CONFIGURATION

DESCRIPTION

1. Technical Field

This invention relates generally to tire construction and more particularly to means for the reduction of rolling resistance by establishing a tire-rim interface for decreasing movement of the tire bead seat portion with respect to the rim.

2. Background Art

It is well known that the rolling resistance of the tires of a moving vehicle constitutes a significant portion of the resistive force that must be overcome by the vehicle. This is especially true for those vehicles having pneumatic tires. The losses owing to rolling resistance in tires often amount to as much as 15% of the power produced by the vehicle's engine.

There are three prime sources occasioning these rolling resistance losses. A reduction in these losses would be desirable. The first of the three sources of rolling resistance, aerodynamic drag, generally amounts to less than 5% of the total rolling resistance of the tire and hence is relatively insignificant. The second, tire-to-ground frictional losses typically contributes between 10 to 20 percent of the total rolling resistance of the tires. However, it is generally disadvantageous to decrease the tire-to-ground losses. This is due to the fact that traction is a concomitant of these tire-road frictional losses, consequently these losses yield necessary safety and motive advantages.

The third, and by far the greatest, cause of rolling resistance in pneumatic tires results from losses internal to the tire itself. In an operational mode the tire rolls, thus there is a loading of each differential unit of the elastomeric material comprising the tire. The loading is cyclical. Consequently, adjacent portions of the tire periodically move relative to each other, expending energy in the process. Such losses are termed "hysteresis losses".

This cyclically loading, causing tire deformation, also tends to cause movement of the tire relative to the rim supporting it. Standard elastomeric tires are generally structured so that beads of the tire are retained on the rim by an axially directed interference fit. For closed torus tires, the roll-restraining hoops (RRH), which are retained by a radially directed interference fit, achieve this function. In many tires this interference fit permits relative circumferential and/or axial motion between the bead or RRH and the rim as the tire rotates. This relative motion results in frictional losses additional to the hysteresis losses. It is believed that at any given time only the most greatly loaded portion of the rim contacting portion of the tire moves significantly relative to the rim. Such localized relative motion is termed "scrubbing".

"Scrubbing" serves not only to waste energy, but is especially detrimental in that most of this wasted energy is degraded to heat. Heat build up can actually impose an operating limitation on the vehicle in that the loading and duration of operation of the tires should not be above a recommended operational temperature.

These losses internal to the tire and wheel assembly are especially troublesome in the aircraft and heavy equipment industries. The rate at which energy is expended by the relative motion discussed above is directly related in magnitude to both the loading induced deflection of the tire and the rate of rotation of the wheel. The heat buildup in tires under great deflection, as in heavy earthmoving vehicles, is, then, very pronounced. Even with established speed and load limitations, such tires are often destroyed or damaged due to overheating.

Similarly, with aircraft becoming increasing greater in weight and landing speed, aircraft tire manufacturers are facing ever-greater heat buildup problems. The operating pressure of many aircraft tires has been increased in efforts to stiffen the tire and hence decrease rolling resistance. This has served to decrease heat build-up. However, the use of elevated pressure has had the detrimental concomitant of increasing the loading imposed by the aircraft on runways resulting, in some instances, in accelerated runway deterioration. Some airports have forbidden certain aircraft with these high pressure tires to land.

The present invention is directed to overcoming one or more of the problems as set forth above.

DISCLOSURE OF THE INVENTION

In one aspect of the present invention, a tire and wheel assembly has a rim assembly and a tire mounted on this rim assembly. The rim assembly includes means for increasing the coefficient of friction and/or the interference fit between said rim assembly and said tire.

In many vehicles having tire and wheel assemblies with rims and tires, a significant portion of the power developed by the vehicle is expended in overcoming the rolling resistance that is inherent in the use of tires. In certain types of tires, a portion of this rolling resistance is the result of relative motion between the tire and the rim. In the present invention, means are provided for decreasing or eliminating the extent of this relative motion. This results in a reduction in the energy wasted as the tire and wheel assembly moves, thereby increasing the efficiency of the vehicle. An additional and often more significant result is a decrease in the rate at which heat builds up in the tire.

BRIEF DESCRIPTION OF THE DRAWING

FIG. 4 shows a similar view of a fourth embodiment of the present invention utilized with a two-piece rim;

FIG. 5 shows a view of a fifth embodiment of the present invention mounted on a single-piece, right cylindrical rim;

FIG. 6 shows a similar view of a sixth embodiment of the present invention mounted on a two-piece rim; and FIG. 7 shows a diagrammatic cross-sectional view of an embodiment of the present invention utilized on a beaded tire.

BEST MODE FOR CARRYING OUT THE INVENTION

Figure 1:
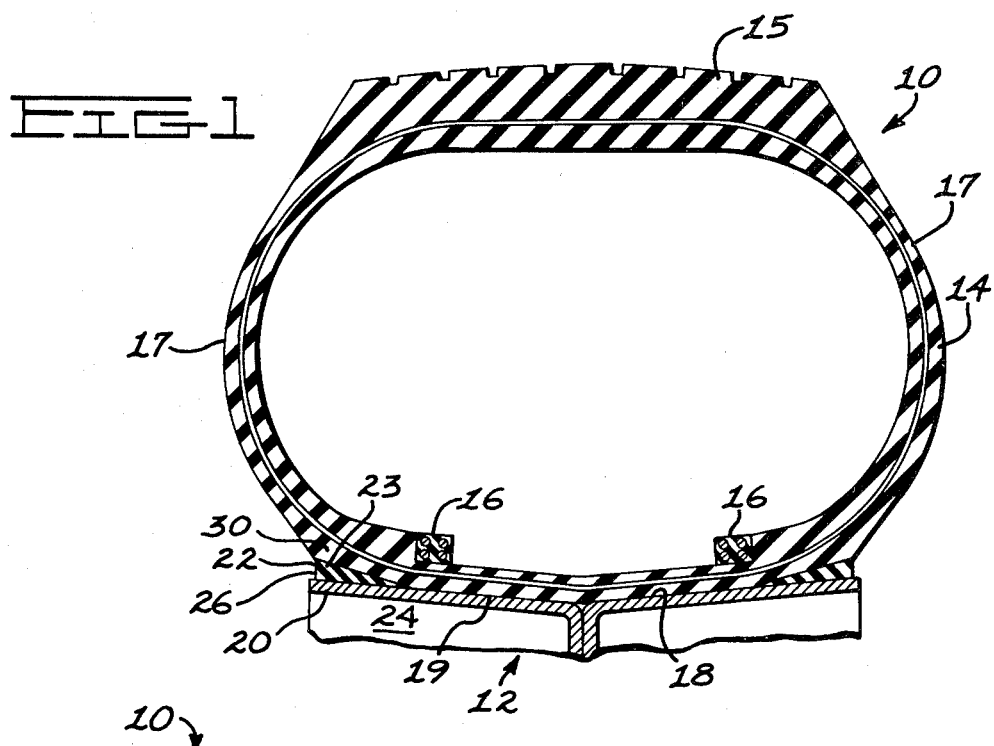
FIG. 1 shows a diagrammatic cross sectional view of a tire and wheel assembly incorporating an embodiment of the present invention, the tire and wheel assembly of this embodiment includes a two-piece rim.

Referring to FIG. 1, a tire and wheel assembly embodying certain of the principles of the present invention is generally indicated by the reference numeral 10. In the preferred embodiment, the tire and wheel assembly 10 is of the class having a rim assembly 12 and a pneumatic, elastomeric closed torus tire 14 retained on said rim assembly 12 by an interference fit between roll restraining hoops 16 on said tire 14 and a tire contacting periphery 18 on said rim assembly 12.

The rim 12 is preferably a two-piece rim having a taper of greater than 3°, preferably between 5° and 7°. One purpose of this taper is to limit the movement of the roll remaining hoops 16 away from the center of the rim assembly 12. The magnitude of the taper immediately proximate the roll restraining hoops 16 is especially critical. It is at this location, that is, where the rim assembly 12 directly faces the innermost portion of each roll restraining hoop 16, that the taper should preferably be sized between about 5° and 7°.

The tire retaining periphery 18 contacts a rim assembly contacting periphery 19 of the tire 14. The tire 14 also has a tread portion 15 which may comprise a belt 20 (not shown), and sidewall portions 17.

While the preferred embodiment of the present invention comprises a closed torus tire 14 mounted on a two-piece rim 12, the present invention is not limited to use with closed torus tires but is broadly suited for any wheels having tires not permanently bonded to the member supporting the tire.

Figure 2:
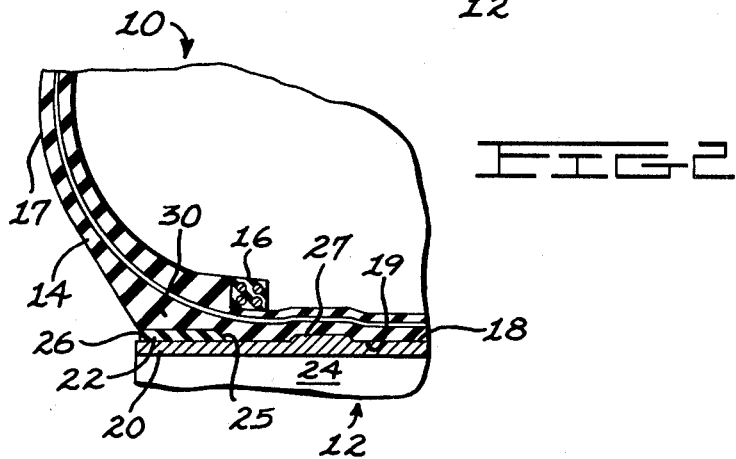
FIG. 2 shows a diagrammatic view of a sidewall, shoulder and rim portion of a tire incorporating a second embodiment of the present invention, the rim utilized in this embodiment is a single-piece right, cylindrical rim.

More specifically, the present invention is not limited to use with two-piece rims. A one-piece rim, well known to those skilled in the art, may also receive a tire 14 embodying principles of the present invention. Such a one-piece rim, as shown in FIGS. 2 and 5 may take the form of a right cylinder. In this embodiment use of a split band style rim is preferred.

The rim assembly 12 has twin circumferential rim edge portions 20 distal from a plane circumferentially bisecting the rim assembly 12. Affixed to the rim assembly 12 at a location adjacent each rim edge portions 20 is an annular elastomeric element 22, preferably, as shown in FIG. 1, an annular wedge fashioned of rubber. As shown, the wedge shaped elastomeric element 22 has a thick portion 23 and is oriented with this thick portion 23 nearest the rim edge portions 20. The affixation of the elastomeric element 22 to the rim assembly 12 is preferably by a bond, such as by vulcanization or adhesive bonding. Preferably, the annular elastomeric element 22 does not extend to a position immediately intermediate the roll restraining hoop 16 and the rim 12.

In an alternate embodiment, shown in FIG. 2, the annular elastomeric element 22 has a substantially constant thickness. An end 25 of the elastomeric element 22 nearest the center of the rim assembly 12 may be tapered to support the rim assembly contacting periphery 19 of the tire 14 intermediate the constant thickness portion of the elastomeric element 22 and the portion of metallic rim 24 in direct contact with the tire 14. This embodiment may be used with a one-piece right cylindrical rim having hoop restraining portions 27, as shown, or may be used with a tapered two-piece rim.

As shown in FIGS. 1-6, each of the elastomeric elements 22 preferably extends so as to contact substantially all of that portion of the rim assembly contacting periphery 19 of the tire 14 which is more distal from the circumferential plane of symmetry of the tire 14 than are the roll restraining hoops 16. That is, each of the elastomeric elements 22 extends from a position adjacent a roll restraining hoop 16 to a position adjacent the corresponding rim edge portion 20. The metal-rubber interface between the tire 14 and the rim assembly 12 intermediate each roll restraining hoop 16 and the corresponding one of the rim edge portions 20 is consequently minimized or eliminated.

In those embodiments described heretofore which incorporate a two-piece rim, the rim assembly 12 comprises a metallic rim 24 with the annular elastomeric element 22 affixed thereto. At a position adjacent each roll restraining hoop 16 the metallic rim 24 extends at an angle in the range of between about 3° to 9° and preferably in the range of about 5° to 7° with respect to the radial axis of the rim assembly 12. The rim 24 extends at this constant angle to the rim edge portion 20.

Figure 3:
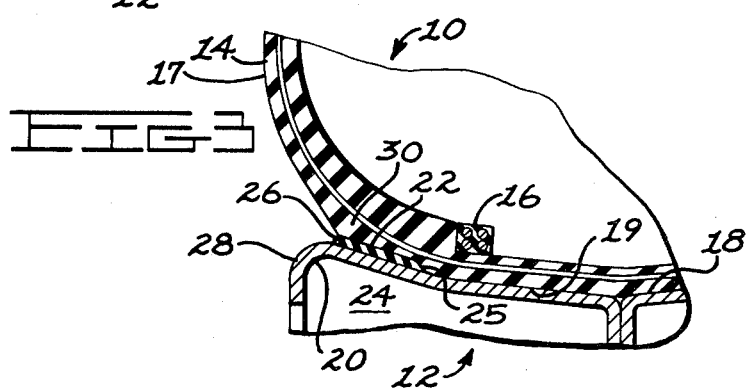
FIG. 3 shows a similar view of a third embodiment of the present invention, utilized with a two-piece rim.

In a third embodiment, shown in FIG. 3, the metallic rim 24 may extend to an angle of between 10 and 80 degrees intermediate the roll restraining hoop 16 and the rim edge portion 20 with the elastomeric element 22 being an annular band rather than a wedge. That portion of the rim 24 immediately adjacent the roll restraining hoop 16 preferably is in the range of about 4 to 9 degrees. A fourth embodiment, detailed in FIG. 4, is similar to the third embodiment but has a wedge-shaped annular elastomeric element 22.

In a fifth embodiment of the present invention, shown in FIG. 5, the metallic rim 24 extends to contact an outer face 26 of the annular elastomeric element 22. This outer face 26 is that portion of the elastomeric element which is furthest from the center of the rim assembly 12. As also shown in FIG. 5, the metallic rim 24 may have a lip 28 which, having extended radially outward to contact the outer face 26, then reverses and extends inward. This lip 28 presents a smooth surface to the sidewalls 17 of the tire 14 minimizing the likelihood of damage to the sidewalls 17 should they be forced into contact with the lip 28. This lip 28 also serves to mitigate potential extrusion of the annular elastomeric element 22. The fifth embodiment is shown having a one-piece rim, but may alternatively have a tapered, two piece rim.

In a sixth embodiment, shown in FIG. 6, the rim lip 28 extends not only around the annular element outer face 26 but also around a shoulder portion 30 of the tire 14. In this embodiment, it is especially preferable that the metallic rim 24 turn downward to form a smooth lip 28.

In certain applications it is advantageous to include circumferentially extending strengthening elements 56 in the elastomeric elements 22. These strengthening elements 56 preferably assume the form of wires or strands embedded in the elastomeric elements 22 and serve to strengthen and render more durable the elastomeric elements. Additionally, the strengthening elements 56 can be so sized as to establish an interference fit between the elastomeric element 22 and the metallic rim 24 obviating the need for bonding the elastomeric element 22 to the metallic rim 24. These strengthening elements 56 are shown in the embodiment of FIG. 5.

As will by now be apparent, numerous combinations of elastomeric elements 22 of various profiles and metallic rims 24 of various configurations may be utilized to obtain a functional elastomeric element 22—tire 14 interface. This interface may, in cross-section, be defined by a curve as well as by a line or series of intersecting lines.

In the present invention, it is not necessary that there be any additional elastomeric element intermediate the two roll restraining hoops 16. The detrimental scrubbing is believed to occur proximate the shoulder portion 30, hence it is this region which it is most desirable to restrain.

As shown in FIG. 7, the present invention has applicability for standard tires having beads 31 as well as beadless tires. In this embodiment an elastomeric element 22 is preferably positioned to eliminate all contact between a standard tire 32 and the metallic rim 24 supporting it. It is preferable in this embodiment that the elastomeric elements 22 extend axially inward along the metallic rim 24 to a position intermediate the beads 31.

INDUSTRIAL APPLICABILITY

In many applications it is undesirable to bond a tire to the rim by which it is supported. In the prior art, a tire is generally maintained on its rim by interference fit alone, establishing a metal-rubber interface across which relative motion, such as chaffing, occurs.

The present invention serves to increase the coefficient of friction between the tire 14 and the rim assembly 12 of a tire and wheel assembly 10. This increased coefficient of friction stems from the fact that the only non-bonded interface between the shoulder 30 of the tire 14 and the rim assembly 12 is rubber-to-rubber rather than metal-to-rubber. That is, if motion is to occur between the tire 14 and rim assembly 12 of the present invention, this motion will be resisted by the friction across a rubber-to-rubber interface rather than a rubber-to-metal interface. The increased coefficient of friction serves to reduce or eliminate relative motion between the tire 14 and rim assembly 12 during use of the wheel consequently reducing the rolling resistance of a tire and wheel assembly 10 incorporating the present invention.

The use of a wedge shaped annular element 22 is especially advantageous in that it provides an increased inward loading to the shoulder 30 of the tire. This provides an increased interference fit which is partially inwardly directed. This assists in overcoming outwardly directed forces imposed upon the shoulder area in operation of the wheel.

The extension of the metallic rim 24 to come around the outer face 26 of the annular element 22 prevents plastic deformation and extrusion of the annular element 22. This is especially important for annular elements 22 which are thick or wedge shaped. It is also beneficial to continue the extension of the rim lip 28 to contact the shoulder 30 of the tire 14. This provides additional support to the shoulder areas of the tire 14 tending to further restrain it from motion relative to the rim assembly.

It should be noted that the use of the annular elastomeric element serves to decrease the possibility of intrusion of grit between the tire 14 and rim assembly 12.

Other aspects, objects, and advantages of the present invention can be obtained from a study of the drawings, the disclosure and the appended claims.

We claim:

1. In a rim assembly (12) having a rim portion (24) adapted to have mounted thereon a closed torus tire (14) having a pair of roll restraining hoops (16) and a shoulder portion (30) axially outward from each of said roll restraining hoop (16), the improvement comprising: said rim assembly (12) including means (22) for reducing the rolling resistance of the closed torus tire (14), said means (22) including an elastomeric element (22) positioned solely between said shoulder portion of said closed torus tire and said rim portion (24) and being bonded to said rim portion (24).

2. The rim assembly (12), as set forth in claim 1, wherein said elastomeric element (22) is an annular rubber element coaxial with said rim portion (24) and is adhesive bonded to said rim portion (24).

3. The rim assembly (12), as set forth in claim 1, wherein said elastomeric element (22) is an annular rubber element bonded to said rim portion (24) by being vulcanized to said rim portion (24).

4. The rim assembly (12), as set forth in claim 1, wherein said elastomeric element (22) is an annular rubber element bonded to said rim portion (24) by means of an interference fit.

5. The rim assembly (12), as set forth in claim 1, wherein said elastomeric element (22) is annular and contains at least one strengthening element (26) embedded therein, said strengthening element (26) extending circumferentially through said elastomeric element 22.

6. A rim assembly (12) adapted to have mounted thereon a closed torus tire (14) which has a pair of spaced apart roll restraining hoops (16) and a rim contacting periphery (19) having a shoulder portion (30) axially outward from each of said roll restraining hoops, said rim assembly comprising:
   a rim portion (24) having a tire retaining periphery (18); and
   an elastomeric element (22) positioned solely between the shoulder portion (30) of said closed torus tire and the adjacent portion of the tire retaining periphery (18), said elastomeric element (22) being affixed to said rim portion.

7. A wheel assembly (10) comprising:
   a rim portion (24) having a tire retaining periphery (18);
   a closed torus tire (14) mounted on said rim portion and having a pair of roll restraining hoops (16) and a rim contacting periphery (19), said rim contacting periphery including a shoulder portion (30) positioned axially outward from each of said roll restraining hoops (16); and
   a pair of elastomeric elements (22) affixed to said rim portion (24), each of said elastomeric elements (22) being positioned between one of said shoulders (30) of the closed torus tire (14) and the adjacent portion of the tire retaining periphery.

8. In a wheel assembly (10) having a closed torus tire (14) mounted on a rim portion (24) of a rim assembly (12), said closed torus tire (14) having a pair of roll restraining hoops (16) and a shoulder portion (30) axially outward from each of said roll restraining hoops (16), the improvement comprising:
   said rim assembly (12) including means (22) for reducing the rolling resistance of said closed torus tire (14), said means (22) including an elastomeric element (22) positioned between said shoulder portion (30) and said rim portion (24), said elastomeric element being attached only to said rim portion (24) and is free from being immediately intermediate any of said roll restraining hoops (16) and said rim portion (24).

9. The wheel assembly (10), as set forth in claim 8, wherein said elastomeric element (22) is an annular rubber element coaxial with and bonded to said rim portion (24).

10. The tire and wheel assembly (10), as set forth in claim 9, wherein said rim assembly (12) includes a rim edge portion (20) and said elastomeric element (22) includes an outer face (26) proximate the corresponding one of said rim edges (20), said rim edge (20) extending substantially around and in contact with said outer face (26).

11. The tire and wheel assembly (10), as set forth in claim 10 wherein said rim edge portion (20) includes a rim lip (28), said rim lip (28) being in contact with said outer face (26).

12. The tire and wheel assembly (10), as set forth in claim 10, wherein said elastomeric element (22) is annular and of wedge-shaped profile having a thick portion (23) abutting said outer face (26).

13. The tire and wheel assembly (10), as set forth in claim 10, wherein said rim edge (20) extends to contact said shoulder portion (30).

14. The tire and wheel assembly (10), as set forth in claim 9, wherein said elastomeric element (22) contains at least one strengthening element (56) embedded therein.

15. The tire and wheel assembly (10), as set forth in claim 14, wherein said strengthening element (56) extends circumferentially through said elastomeric element (22).

16. The tire and wheel assembly (10) as set forth in claim 15, wherein said strengthening element (56) is metallic.

* * * * *